US005473893A

United States Patent [19]

Achten et al.

[11] Patent Number: 5,473,893

[45] Date of Patent: Dec. 12, 1995

[54] FREE-PISTON ENGINE HAVING A FLUID PRESSURE UNIT

[75] Inventors: Peter A. J. Achten, Eindhoven; Theodorus G. Potma, Kaag, both of Netherlands

[73] Assignee: Innas Free Piston B.V., Breda, Netherlands

[21] Appl. No.: 244,146

[22] PCT Filed: Nov. 19, 1992

[86] PCT No.: PCT/NL92/00212

§ 371 Date: May 18, 1994

§ 102(e) Date: May 18, 1994

[87] PCT Pub. No.: WO93/10345

PCT Pub. Date: May 27, 1993

[30] Foreign Application Priority Data

Nov. 19, 1991 [NL] Netherlands .......................... 9101934

[51] Int. Cl.[6] .................................................. F16D 31/02

[52] U.S. Cl. ......................... 60/413; 417/364; 123/46 SC

[58] Field of Search ............................ 60/595, 596, 413, 60/416; 417/364; 123/465 C

[56] References Cited

U.S. PATENT DOCUMENTS

| | | | |
|---|---|---|---|
| 2,731,793 | 1/1956 | Lewis | 60/596 |
| 3,038,298 | 6/1962 | Horgen | 60/595 |
| 3,044,452 | 7/1962 | McCrory et al. | 123/46 SC |
| 3,606,591 | 9/1971 | Potma | 417/364 |
| 3,613,724 | 10/1971 | Carson | 137/612.1 |
| 4,599,861 | 7/1986 | Beaumont | 60/595 |
| 4,803,960 | 2/1989 | Koppen | 60/595 |

*Primary Examiner*—Edward K. Look
*Assistant Examiner*—Hoang Nguyen
*Attorney, Agent, or Firm*—Kinney & Lange

[57] ABSTRACT

A free-piston engine having a fluid pressure unit, comprises a cylinder and a piston arranged therein. The piston is equipped with a plunger-shaped extension including a working section having a room bordered by a first axial face of the plunger-shaped extension and the volume of which is reduced when the piston makes an expansion stroke, and to which a discharge channel to a high pressure accumulator and a supply channel from a supply reservoir connects. The piston further includes a compression section including a chamber having a first chamber portion enclosed by a second axial face in the bottom dead center of the piston and a second chamber portion bordered by a third axial face. The first chamber section decreases at the start of the compression stroke of the piston, wherein the first chamber portion has an open connection with a compression accumulator through a first connecting channel and the second chamber portion unit is connected to the compression pressure accumulator through a second connecting channel and is connectable to a pressure device for starting the compression stroke, whereafter the first connecting channel is opened in order to exert pressure on the third axial face. The plunger-shaped extension includes a passage extending from the first to the second chamber portion in the bottom dead center of the piston. A resiliently supported and axially movable closure element extends within the second chamber portion that lies in the path of the passage in the third axial face and encloses the passage at the end of the expansion stroke of the piston and opens it at the start of the compression stroke.

8 Claims, 5 Drawing Sheets

FREE-PISTON ENGINE HAVING A FLUID PRESSURE UNIT

BACKGROUND OF THE INVENTION

The present invention relates to a free-piston engine having a fluid pressure unit according to the preamble of claim 1.

In a known free-piston engine having a hydraulic unit (see U.S. Pat. No. 3,606,591), a second chamber portion of a second chamber is connected to the compression pressure accumulator through a connecting channel having a two-way valve. A compression stroke starts if a two-way switch is switched from the closed position to an open position. During the first part of the compression stroke hydraulic liquid flows through said two-way valve until, in a second part of the compression stroke, a connecting channel of a first chamber portion of the second chamber takes up the main part of the liquid flow from the compression pressure accumulator. In this prior art piston engine, very high and also conflicting demands are made upon the two-way valve. Then the two-way valve should have a very short switching time, ca. 1 ms, on the one hand requiring a small valve, and the two-way valve should have a relatively large flow capacity on the other hand in order to restrict the loss during the first part of the compression stroke. It is hardly possible to comply with these high and conflicting requirements so that in the present free-piston engines the efficiency is adversely affected by the loss of energy in the two-way valve, while the power of the engine is restricted by the slowness of the two-way valve.

It is an object of the invention to provide a free-piston engine having a fluid pressure unit in which said problem is solved in an effective way.

SUMMARY OF THE INVENTION

According to the invention, only pressure means, for instance a two-way valve connected to the compression pressure accumulator or an independent pulsating small pump, are required to effect a very slight movement of the plunger-shaped piston extension to cause the passage means in the plunger-shaped piston extension to be opened by the closure element whereafter the passage means take over the task of the pressure means. Due to this feature the pressure means is only required to deliver a small amount of hydraulic liquid without involving a great loss of energy. As a result, it is possible to select a very small and quick valve having a small slowness for the two-way valve. Generally speaking, the passage means in the plunger-shaped piston extension can be selected efficiently big to cause a low flow resistance reducing the loss of energy during the flow therethrough. Consequently, the present restrictions to the power of a free-piston engine by the two-way valve is broken down by the invention. The particular valve according to the invention may of course also be used for other functions.

Preferably, there are provided means acting such upon the closure element that when the piston springs back at the end of the expansion stroke the closure element follows the piston and continues to close the passage means, but when the compression stroke starts the closure element opening the passage means.

BRIEF DESCRIPTION OF THE DRAWINGS

The invention will hereafter be elucidated with reference to the drawing showing embodiments of a free-piston engine having hydraulic unit by way of example.

DETAILED DESCRIPTION OF THE PREFERRED EMBODIMENTS

Figure 1:
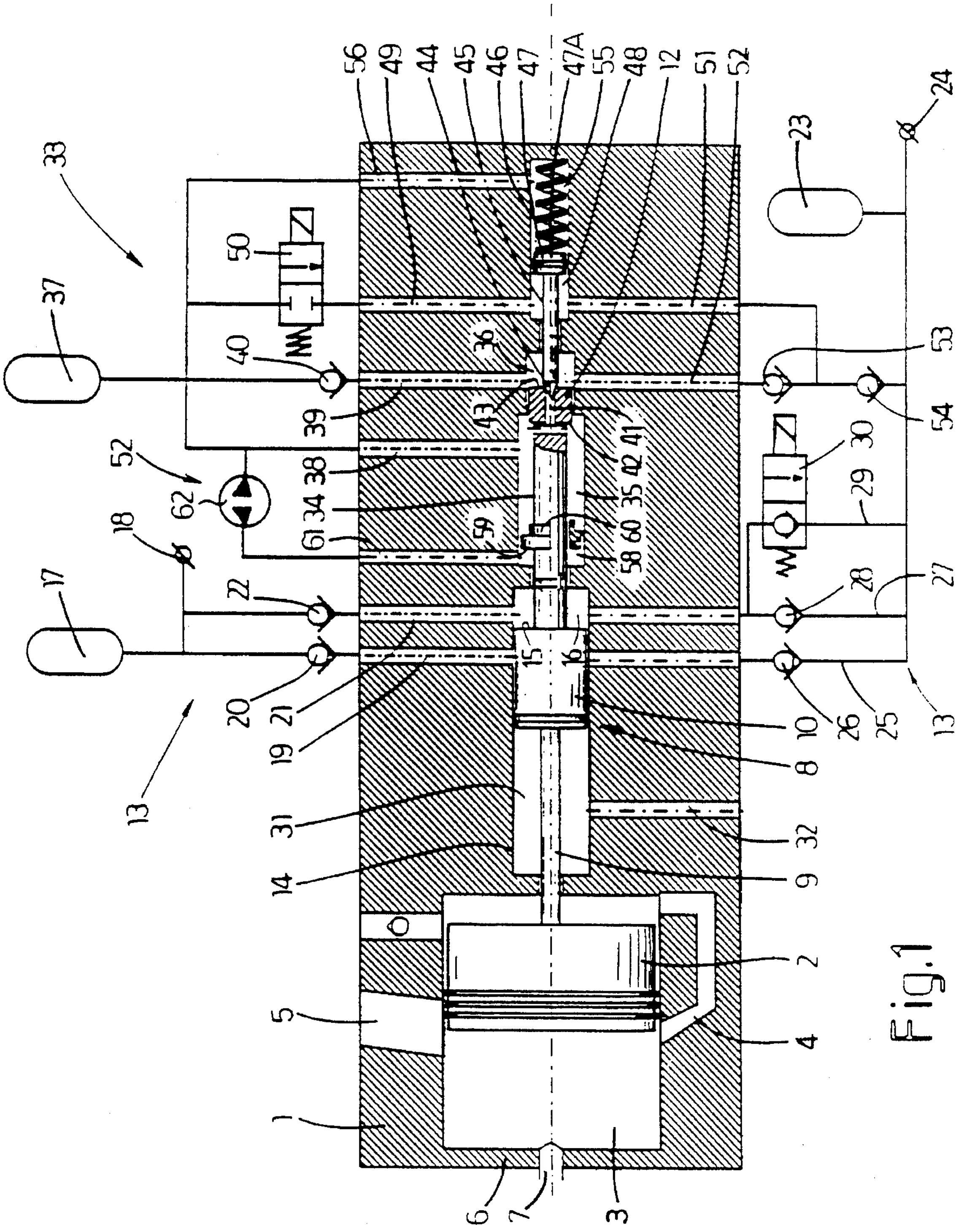
FIG. 1 shows a scheme, partly as longitudinal sectional view of the free-piston engine having a hydraulic unit.

FIG. 1 shows an exemplary embodiment of a free-piston engine comprising a cylinder 1 and a movable piston 2 arranged therein. This piston 2 borders one side of the combustion room 3 and is movable between a first position or bottom dead centre in which the volume of the combustion room 3 is at a maximum, and a second position or top dead centre in which the volume of the combustion room 3 is at a minimum. To the combustion room connects an air inlet. 4 and a combustion gas outlet 5. In a cylinder head 6 bordering the combustion room 3 on the other side there is provided an injector 7 for injecting fuel, such as diesel oil, into the combustion room 3. During the compression stroke of the piston 2, that is when the piston 2 is displaced from the bottom dead centre to the top dead centre, air supplied to the combustion room 3 through the air inlet 4 is compressed, then liquid fuel is injected into the combustion room 3 through the injector 7, which then comes to spontaneous combustion under influence of pressure and temperature in the combustion room 3, which leads to expansion of the fuel-air mixture in the combustion room 3 causing the piston to make an expansion stroke towards the bottom dead centre. Of course, it is also possible that the engine operates according to another principle instead of the diesel principle, for example by means of spark ignition.

To convert mechanical energy rendered to the piston 2 during the expansion of the fuel-air mixture into hydraulic energy and to convert hydraulic energy into a movement of the piston to make a compression stroke, the piston 2 is equipped with a plunger-shaped piston extension 8. This plunger-shaped piston extension 8 includes, as seen from the piston 2, a first rod section 9, a first plunger section 10, a second rod section 11 and a second plunger section 12.

The first plunger section 10 cooperates with a working section 13 of the hydraulic unit and, for this purpose, it is slidable within a first chamber 14. The first plunger section 10 comprises a first axial face 15 bordering a room 16 of the first chamber 15 such that the volume of the room 16 decreases during the expansion stroke of the piston 2.

The working section 13 comprises a high pressure accumulator 17 communicating with a connection 18 of the high pressure side of a user, such as a hydrostatic drive for a vehicle. The room 16 of the first chamber 14 communicates with the high pressure accumulator 17 through a first discharge channel 19 having a non-return valve 20 and through a second discharge channel 21 having a further non-return valve 22. The first discharge channel 19 is only operative during the first part of the expansion stroke of the piston 2 and has a low flow resistance as well as the non-return valve 20. After a certain part of the expansion stroke of the piston 2, the first discharge channel 19 is closed by the circumferential wall of the first plunger section 10 and then discharge of hydraulic liquid from the room 16 of the first chamber 14 takes place only through the second discharge channel 21 including a quick non-return valve 22.

The working section 13 of the hydraulic unit further includes a low pressure accumulator 23 communicating with a connection 24 of the low pressure side of a user, such as the hydrostatic drive. The low pressure accumulator 23 communicates with the room 16 in the first chamber 14 through a first supply channel 25 having a non-return valve 26 and through a second supply channel 27 having a further non-return valve 28. The latter non-return valve 28 may be passed by through a by-pass line 29 including a two-way valve 30 switchable between a position in which it acts as a non-return valve and a position in which it enables a free discharge of hydraulic liquid from the room 16. The non-return valve 26 and the first supply channel 25 have a low flow resistance, while the non-return valve 28 in the second supply channel is of a quick closing type, for example being equipped with a heavy set back spring.

In a first part of the compression stroke of the piston 2, a supply of hydraulic liquid from the low pressure accumulator 23 to the room 16 is possible only through the second supply channel 27, and in a second part of the compression stroke, the second supply channel 27 is opened by the circumferential wall of the first plunger section 10 and then hydraulic liquid may be supplied to the room 16 through the first supply channel 25.

In the first chamber 14, on the other side of the first plunger section 10, there is a further room 31 which is preferably pressureless, for example communicates with the environment through the channel 32, in order to cause minimum losses during the reciprocating movement of the first plunger section 10.

The second plunger section 12 cooperates with a compression section 33 and, for this purpose, moves within a second chamber 34 comprising a first chamber portion 35 having a diameter being equal to or, in this case, being greater than that of the second plunger section 12, and a second chamber portion 36 having a diameter selected such that the second plunger section 12 sealingly fits into it.

The compression section 33 further includes a compression pressure accumulator 37 being in open communication with the first chamber portion 35 of the second chamber 34 through a first connecting channel 38 having a low flow resistance. A second connecting channel 39 extends between the second chamber portion 36 of the second chamber 34 and the compression pressure accumulator 37 and comprises a quick closing non-return valve 40 encountering a flow to the second chamber portion 36.

In the second plunger section 12 and the second rod section 11 there is formed a passage 41, in this case consisting of an axial and joining radial bore and opening on one end into the first chamber portion 35 in a position right behind a second axial face 42 bordering the first chamber portion 25 of the second chamber when the piston 2 is in the bottom dead centre, and on the other hand opening in a third axial face 43 on the free end of the plunger-shaped piston extension, which borders the second chamber portion 36 of the second chamber 34 when the piston 2 is in the bottom dead centre. The passage 41 is closable by the conical tip 44 of a needle body 45 extending through the second chamber portion 36 and coming out through a guiding and sealing bore in a third chamber 46 where the needle body 45 is connected to a plunger member 47 fitting sealingly in the third chamber 46. A compression spring in the form of a helical spring 47A loads the plunger member 47 and the needle body 45 in a direction opposite to the direction of the expansion stroke of the piston 2 and the plunger-shaped piston extension 8. The plunger member 47, on the side of the needle body 45, borders a room 48 to which a supply channel 49 connects, which supply channel 49 connecting to the compression pressure accumulator 37 through a two-way valve 50, but which could also be provided with a separate pulsating pump element. On the other hand, the room 48 of the third chamber 46 is connected by a connecting channel 51 to a connecting channel 52 extending between the low pressure accumulator 23 and the second chamber portion 36 of the second chamber 34. Between the connection of the connecting channel 51 to the connecting channel 52 and the second chamber portion 36 is a quick closing non-return valve 53 resisting a flow of hydraulic liquid from the second chamber portion 36, and between the low pressure accumulator 23 and the connection of the connecting channel 51 to the connecting channel 52 there is a non-return valve 54 preventing a flow to the low pressure accumulator 23. The non-return valve 54 is of a slower closing type than the quick closing non-return valve 40 in the second connecting channel 39, the meaning of which will be explained later on.

On the side of the helical spring 47A, the plunger member 47 of the needle body 45 further borders a second room 55 in the third chamber 46, which second room 55 is in open communication with the compression pressure accumulator 37 through a connecting channel 56.

Figure 2:
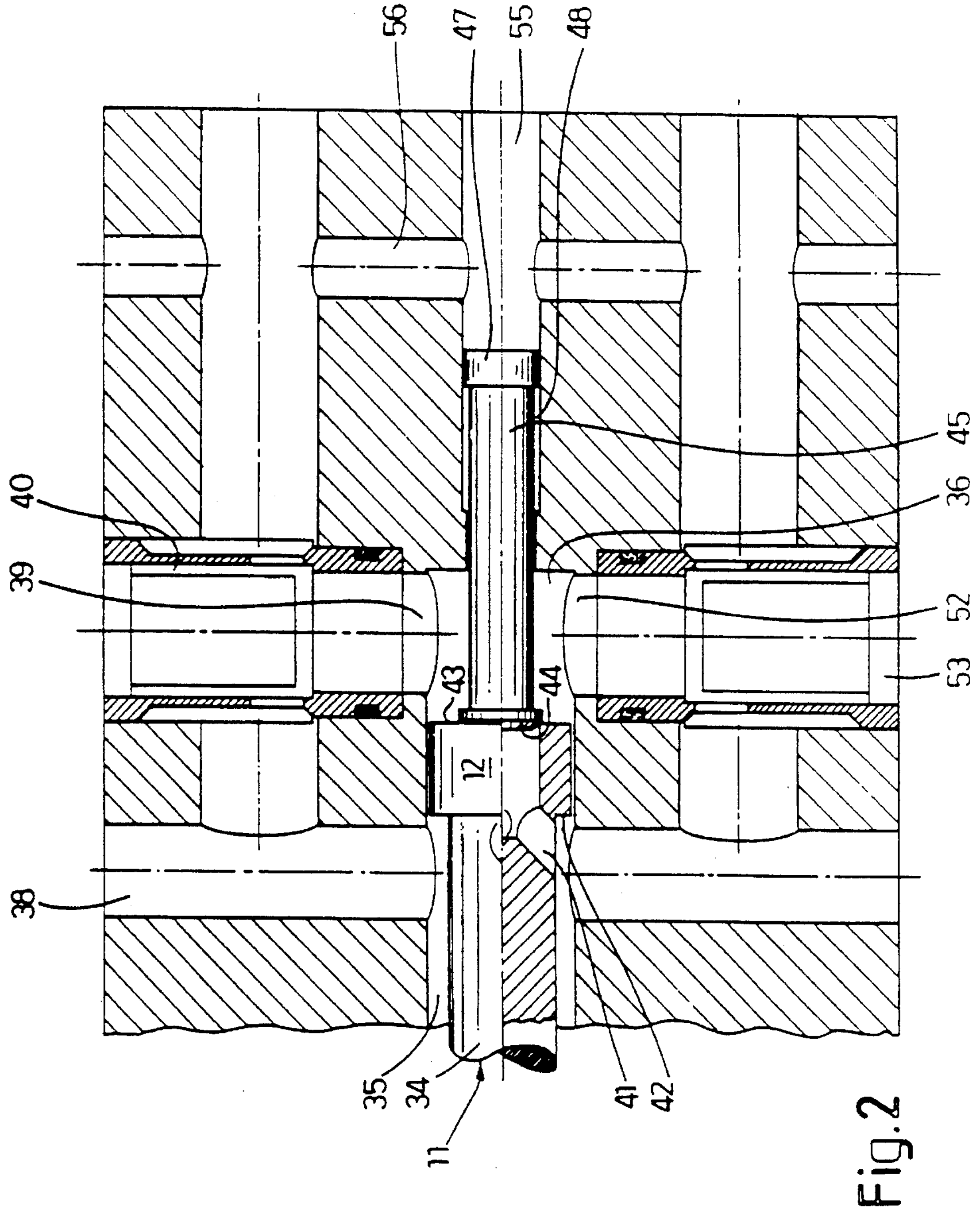
FIG. 2 is an enlarged longitudinal sectional view of a part of the hydraulic unit of FIG. 1 illustrating the actual structural proportions of the exemplary embodiment.

FIG. 2 shows more details of a portion of the hydraulic unit of FIG. 1, in-which the structural proportions of the needle body 45 can be recognized. It is shown for instance that the diameter of the plunger member 47 is only very slightly (5%) greater than that of the needle body 45 in order to keep the volume of the room 48 to a minimum so as to minimize the frequency retardation as a result of the oil volume. The tip 44 is truncated and the chamfered portion is slightly convex to facilitate the location and seal thereof onto the seat of the passage 41 in the plunger section 12. The needle body 51 has a self locating straight guide to obtain a light and smooth running of the needle body 45.

The normal operation of the free-piston engine having a hydraulic unit, and in particular the compression section thereof, is as follows.

In an expansion stroke of the piston 2 as a consequence of the expansion of the fuel-air mixture in the combustion room 3 of the cylinder 1, ignited by spontaneous combustion, hydraulic fluid is discharged by the first plunger section 10 from the room 16 of the first chamber 14 to the high pressure accumulator 17, first through the first discharge channel 19 having a low flow resistance and then through the second discharge channel 21. In this manner, pressure is built up in the high pressure accumulator 17 which can be used by the user connected to the connection 18.

During said expansion stroke of the piston 2, the needle body 45 and the plunger member 47 are maximally pushed away by the helical spring 47A so that the needle body 45 together with its conical tip 44 projects into the second chamber portion and eventually into the first chamber portion 35 of the second chamber 34. Upon approach of the plunger-shaped piston extension 8, the second plunger section 12 of the plunger-shaped piston extension 8, the speed of which is decreased in the meantime, comes in contact with the conical tip 44 of the needle body 45, the conical tip 44 penetrating into the passage 41 and, as a result, closing off the passage 41 in the second plunger section 12. The hydraulic liquid in the second chamber 34, which was discharged mainly through the first connecting channel 38 to the compression pressure accumulator 37 in the first part of the expansion stroke of the piston 2, is now conducted only through the second connecting channel 39 and through the quick closing non-return valve 40 to the compression pressure accumulator 37 after the second plunger section 12 has entered the second chamber portion 36 of the second chamber 34.

If the energy in the piston 2 coming from the expansion in the combustion room 3 is fully absorbed by the hydraulic liquid, the piston 2 and hence also the plunger-shaped piston extension 8 comes to rest. Both the non-return valve 22 in the second discharge channel 21 of the working section 13 and the non-return valve 40 in the second connecting channel 39 of the compression section 33 should then close very quickly so that hydraulic liquid in the room 16 and the second chamber portion 36, respectively, cannot flow back. The hydraulic liquid in the working section 13 and the compression section 33 is subjected, however, to a high pressure and hydraulic liquid in the room 16, the second chamber portion 36, the second discharge channel 21 and the second connecting channel 39 is inclined to expand causing the piston to spring back with a very high acceleration until the retaining force on the plunger-shaped piston extension 8, caused by the compression pressure in the first chamber portion 35 of the second chamber 34 acting upon the second axial face 42, is in balance with the opposite forces on the plunger-shaped piston extension 8.

The piston body 45 should follow this very quick rebound of the piston 2 in order to keep the passage 41 in the second plunger section 12 closed with its conical tip 44 because otherwise hydraulic liquid can flow from the first chamber portion 35 through the passage 41 to the second chamber portion 36 and thereby starting a new compression stroke. Allowing the needle body 45 to follow the piston 2 is effected because the non-return valve 54, through which hydraulic liquid is sucked-in from the low pressure accumulator 23 during the movement of the plunger member 47 of the needle body 45 at the end of the expansion stroke, closes slower than the non-return valve 40 in the second connecting chamber 39. Due to this quick closure of the non-return valve 40, the pressure in the second chamber portion 36 drops quickly, whereby first the pressure in the room 48 remains as low as the pressure in the low pressure accumulator 23, and after closing the non-return valve 54 the pressure in the second chamber portion 36 is decreased in the meantime so that any pressure in the room 48 can be relieved through the non-return valve 53. In this manner, the pressure in the room 48 remains low so that there is no large retaining force on the plunger member 47 of the needle body 54 when the piston 2 and the plunger-shaped piston extension 8 springs back from the bottom dead centre, whereby the needle body 45 is allowed to follow the movement of the plunger-shaped piston extension as a result of the force of the helical spring 47A and the compression pressure on the plunger member 47 and hence the passage 41 in the plunger-shaped piston extension 8 remains closed by the conical tip 44 of the needle body 45 so that the piston 2 can be retained in its bottom dead centre. Only if a new compression and expansion stroke of the piston 2 is required, the piston is caused to move again.

When the piston 2 springs back in the neighbourhood of the bottom dead centre, hydraulic liquid may leak from the second chamber portion 36 of the second chamber 34 past the needle body 45 to the room 48 of the third chamber. The volume of this room 48 of the second chamber 46 and the channels connected thereto are sufficiently big to prevent in that case a too large pressure rise which would disturb the function of the needle body 45.

To start a new compression stroke of the piston 2, the two-way valve 50 is switched over thereby allowing hydraulic liquid to flow from the compression pressure accumulator 37 through a discharge channel 49 to the room 48 in the third chamber 46 and then through the connecting channel 51, the non-return valve 43 and the connecting channel 52 to the second chamber portion 36 of the second chamber 34. This pressure pulse pushes the second plunger section 12 and hence the whole plunger-shaped piston extension 8 and the piston 2 away by a load onto the third axial face 43, while the needle body 45 cannot follow the plunger-shaped piston extension 8 due to its slowness and the insufficient spring force of the spring 47A. Already after a very slight displacement of the second plunger section 12, the passage 41 is opened thereby allowing hydraulic liquid to flow from the first chamber portion 35 to the second chamber portion 36 disturbing the balance of forces and shooting away the piston. Since the passage 41 has a relatively large diameter, it also has a low flow resistance so that a quick and highly efficient compression stroke may be made. After the piston 2 has left, the needle body 45 will also be urged to its extreme position by the helical spring 47A, in which it is able to receive the plunger-shaped piston extension 8 again in the next expansion stroke.

According to the invention, no high demands are made anymore upon the two-way valve 50 for starting the compression stroke of the piston concerning the low flow resistance because this two-way valve 50 is flowed through only during a very small part of the compression stroke of the piston 2 whereafter the passage 41 in the plunger-shaped piston extension 8 takes over this task.

In FIG. 1 it is further shown that the hydraulic unit comprises an auxiliary means used for bringing the piston 2 to the bottom dead centre when the free piston engine is started or when it is restarted after a so called "misfiring" in which the fuel-air mixture in the combustion room 3 is not ignited and as a result thereof the piston 2 is not driven up to its bottom dead centre. This auxiliary means consists of a room 58 in the first chamber portion 35 of the second chamber, which room 58 is bordered by an axial face 59 of a ring-shaped element 60 engaging sealingly and slidably on the second rod section 11 of the plunger-shaped piston extension 8 on the one hand and engaging sealingly on the circumferential wall of the first chamber portion 35 of the second chamber 34 on the other hand. To the room 58 connects an auxiliary channel 61 in which a bi-directional pump 62 is incorporated and which connects to the compression pressure accumulator 37.

During the normal operation of the free-piston engine, the ring-shaped element 60 is substantially stationary in the position shown, in which it serves as it were as a stationary wall of the first chamber 35 and in which the second rod section 11 reciprocates through the ring-shaped element 60. Upon actuation of the auxiliary means, the two-way valve 30 in the by-pass line 29 of the working section 13 of the hydraulic unit is switched so that the high pressure in the room 16 falls away. Then the bi-directional pump 62 is driven such that the room 58 is pressurized so as to displace the ring-shaped element 60 in a direction towards the bottom dead centre of the piston 2. At a certain moment, the ring-shaped element 60 will abut against the second axial face 42 formed on the second plunger-section 12 so that the ring-shaped element 16 will carry along the plunger-shaped piston extension 8 and hence the piston 2 to the desired position. Before a new compression stroke is made, the ring-shaped element 60 is brought back to its initial position by driving the bi-directional pump 62 in the other direction so that the ring-shaped element 60 can return to its initial position. By using this ring-shaped element 60, the room 58 is used only if it is necessary and no continuous filling and emptying the room 58 takes place which would have been the case if the ring-shaped element 60 would be fixed to the plunger-shaped piston extension.

FIG. 3–8 show an alternative embodiment of the compression section of the hydraulic unit according to the invention, which is particularly intended to facilitate the start of the compression stroke of the piston 8. The two-way valve 50, comprising a parallel non-return valve 63, is now connected to a pressure booster 64. This pressure booster comprises a plunger 65 having axial faces 66, 67 and 68 bordering rooms 69, 70 and 71, respectively. The plunger 65 is biassed by a spring 72 in a direction to a position in which the room 69 connected to the two-way valve 56 is at a minimum. The room 71 is stepped and the diameter of the smallest part substantially equals the diameter of the corresponding axial face 68 so that this axial face 68 of the plunger 65 can separate both portions of the room 71. The room 70 of the pressure booster 64 communicates with the second chamber portion 36 adjacent the axial face 43 of the plunger-shaped piston extension 8. The portion of the room 71 of the pressure booster 64 having the greater diameter communicates on the one hand with the second chamber portion 36 through a non-return valve 73 and with the low pressure accumulator 23 through a non-return valve 74 on the other hand. The portion of the room 71 having a smaller diameter is in open communication with the room 48 for the plunger member 47 of the needle body 45. A second two-way valve 75 having a parallel non-return valve 76 is arranged in the connection between the compression pressure accumulator 37 and the second chamber portion 36.

The operation of this alternative embodiment of the hydraulic unit will now be explained with reference to FIG. 3–8.

Figure 3:
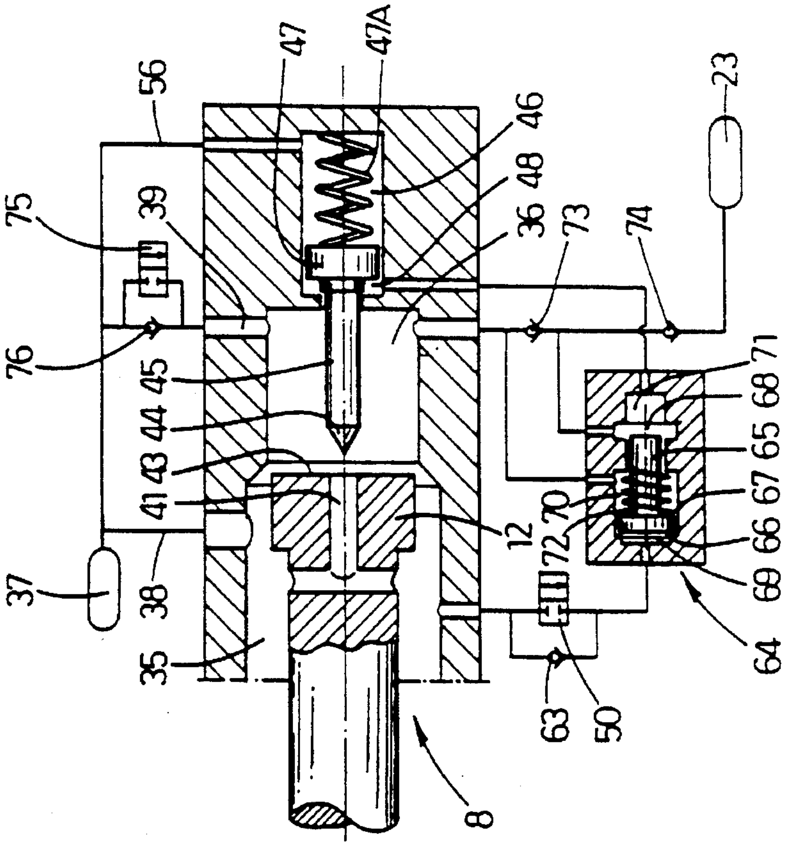

FIG. 3 shows the position of the various parts when the piston 2 together with the plunger-shaped piston extension 8 has arrived near the end of the expansion stroke. The needle body 45 is urged into the extreme position by the spring 47A, while the plunger 65 is kept in its rest position by the spring 72. The two-way valves 50 and 75 are closed.

Figure 4:
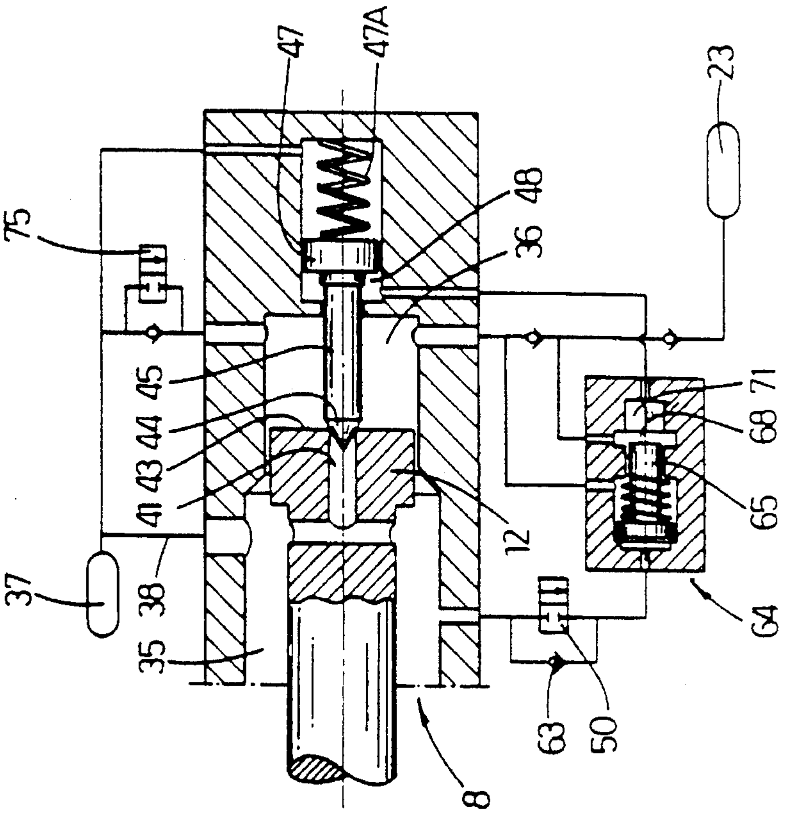
FIG. 3–8 show the operation of the hydraulic unit with the help of different working positions of a part of an alternative embodiment of the hydraulic unit according to the invention.

In FIG. 4 the plunger section 12 of the plunger-shaped piston extension 8 has arrived in the second chamber portion 36 and the plunger section 12 has come into engagement with the tip 44 of the needle body 45 closing off the passage 41 in the second plunger section 12. The needle body 45 and the plunger member 47 are carried along by the plunger-shaped piston extension 8 against the force of the helical spring 47A. As a result, the pressure in the room 48 in front of the plunger member 47 drops. Due to the open connection between the room 48 and the room 71 in the pressure booster 64 the pressure there also decreases to that of the low pressure accumulator 23.

Figure 5:
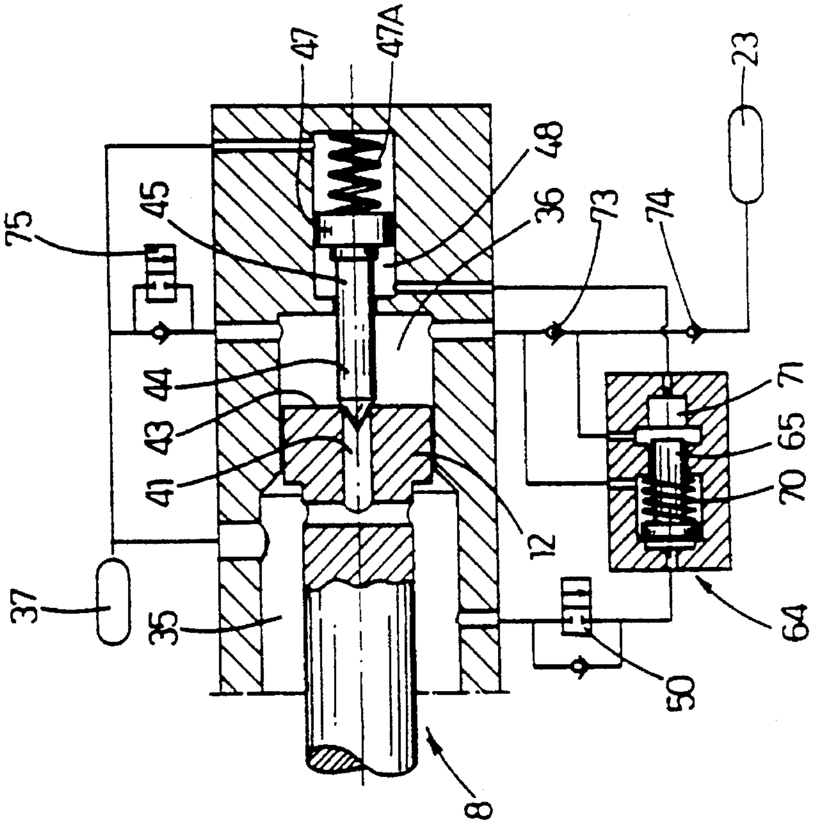

In FIG. 5, the plunger-shaped piston extension 8 has sprung back from an extreme position slightly to the stabilized bottom dead centre. This springing back of the second plunger section 12 in the second chamber portion 36 causes the pressure in the second chamber portion 36 to drop to substantially that of the low pressure accumulator 23. Due to the pressure differential over the plunger member 47 of the needle body 45 and due to the force of the helical spring 47A, the needle body 45 is enabled to follow the movement of the plunger-shaped piston extension 8 so that the passage 41 in the second plunger section 12 remains closed.

Figure 6:
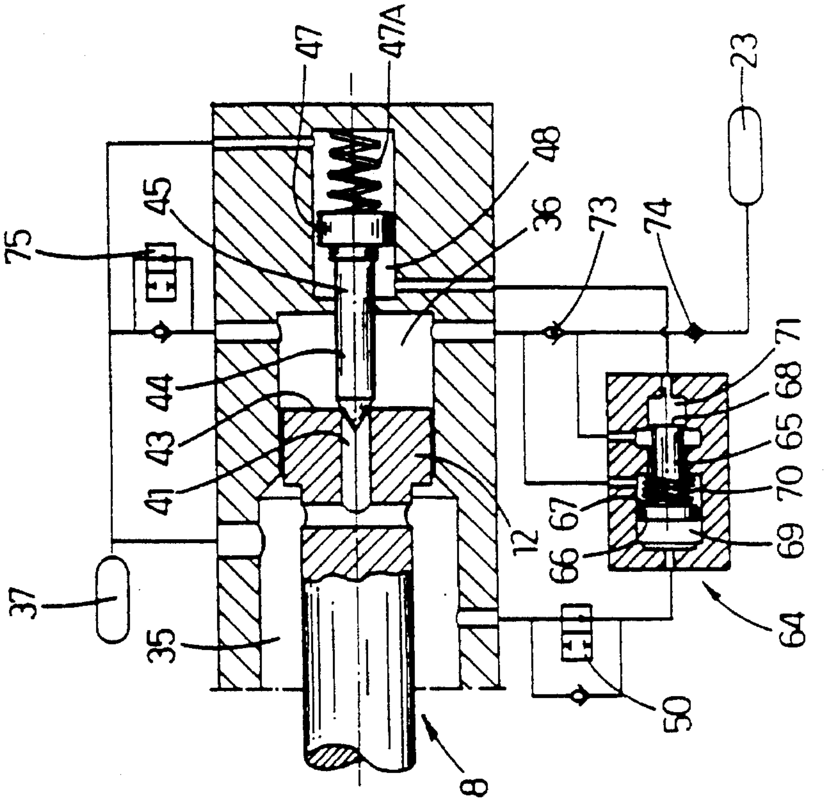

FIG. 6 shows the start of the compression stroke of the piston 2, for which purpose the two-way valve 50 and in this exemplary embodiment also the two-way valve 75 are opened. Due to the opening of the two-way valve 50, pressure from the compression pressure accumulator 37 arrives in the room 69 of the pressure booster 64 and consequently also acts upon the axial face 66 of the plunger 65 thereof, whereby the plunger 65 is urged away against the force of the spring 72 such a distance that the portion of the room 71 having the smaller diameter is closed off by the axial face 68 so that the room 48 in front of the plunger member 47 of the needle body 45 is also closed causing a pressure built-up in the room 48. This pressure in the room 48 prevents a movement of the needle body 45. Due to the displacement of the plunger 65 of the pressure booster 64 the pressure in the room 70 and consequently in the second chamber portions 36 rises. Due to the second two-way valve 75, this pressure rise in the second chamber portion is substantially higher because the compression pressure is admitted into the second chamber portion 36. This assistance of the additional two-way valve 75 is not necessary in 95% of the frequence range, but for a small number of frequencies the two-way valve 75 may be used to obtain an easier control.

Figure 7:
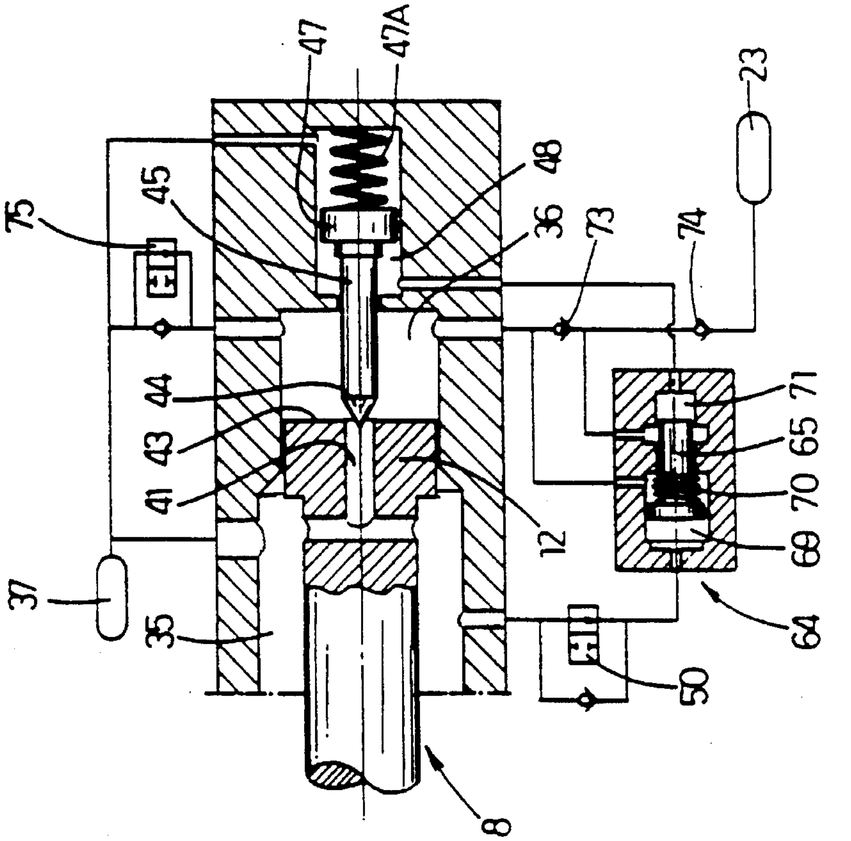

FIG. 7 shows the position of the plunger-shaped piston extension 8 wherein it has started its compression stroke due to the pressure in the second chamber portion 36, while the needle body 45 remains stationary and is not able to follow the second plunger section 12 due to the pressure in the room 48 thereby opening the passage 41 and allowing hydraulic liquid to easily flow through the passage 41 having a low flow resistance to the second chamber portion 36 thereby forcing the plunger-shaped piston extension 8 to the top dead centre of the piston 2 with great speed by the pressure on the axial face 43.

Figure 8:
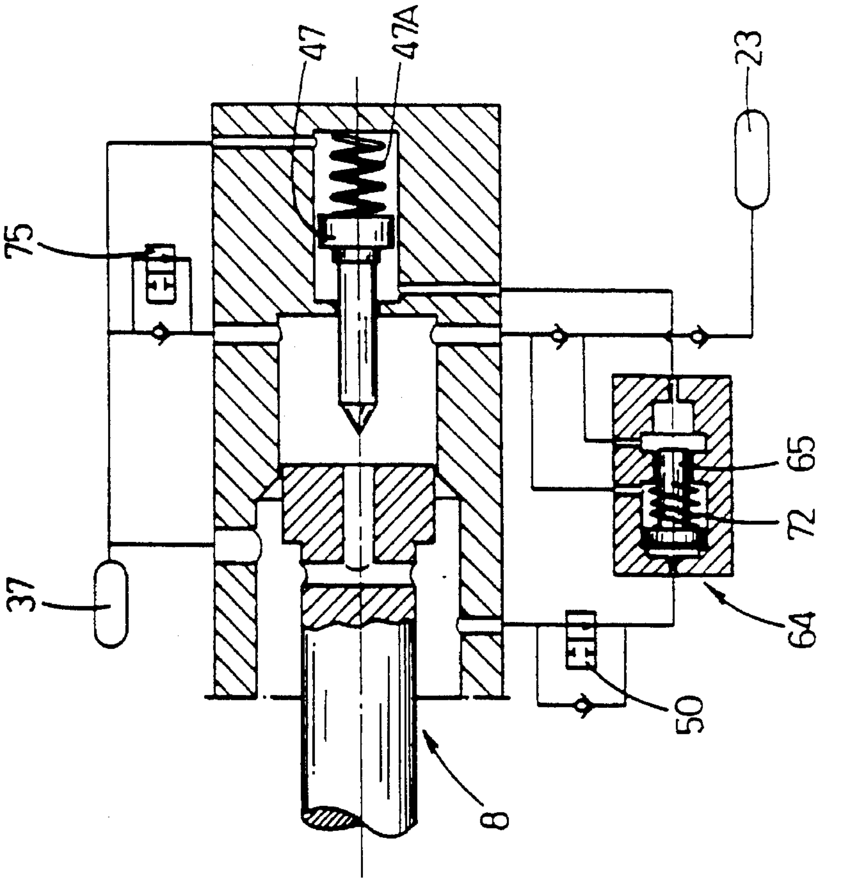

FIG. 8 finally shows a further position in which the plunger 65 of the pressure booster 46 is urged back to the initial position by the force of the spring 72. The needle body 45 will eventually be forced back to the position of FIG. 3 so that both members are ready again for the next expansion stroke of the piston 2 and the plunger-shaped piston extension 8.

The invention is not restricted to the embodiment shown in the drawing and described before by way of example, which may be varied in different manners within the scope of the appended claims. For example, the invention can also be used for a free-piston engine having two opposed pistons bordering one combustion room. Furthermore, the pressure booster may be integrated in or near the needle body.

What is claimed is:

1. A free-piston engine having a fluid pressure unit, comprising a cylinder and a piston arranged within the cylinder and limiting one side of a combustion room, said piston reciprocating within the cylinder for making a compression stroke from a bottom dead centre, in which a volume of the combustion room is at a maximum, to a top dead centre, in which the volume of the combustion room is at a minimum, and for making an expansion stroke from the top to the bottom dead centre, wherein energy from the unit is received and delivered to the unit, respectively, the piston being equipped with a plunger-shaped extension including one or more axial faces and moving within one or more fluid chambers for delivering expansion energy to or receiving compression energy from the fluid, at least the fluid chamber cooperating with the axial face at a free end of the plunger-shaped piston extension comprising valve-shaped means formed by fluid flow passage means extending through the axial face on the free end of the plunger-shaped piston extension to permit fluid flow therethrough and having a valve seat adapted to be closed by a movably supported closure element.

2. A free-piston engine having a fluid pressure unit, comprising a cylinder and a piston arranged within the cylinder and limiting one side of a combustion room, said piston reciprocating within the cylinder for making a compression stroke from a bottom dead centre, in which volume of the combustion room is at a maximum, to a top dead centre, in which the volume of the combustion room is at a minimum, and for making an expansion stroke from the top to the bottom dead centre, wherein energy from the unit is received and delivered to the unit, respectively, the piston being equipped with a plunger-shaped extension including a working section having a room bordered by a first axial face of the plunger-shaped extension and a volume of which is reduced when the piston makes the expansion stroke, discharge channel means to a high pressure accumulator and supply channel means from a supply reservoir connecting to said room, and further comprising a compression section including a chamber having a first chamber portion closed by a second axial face in the bottom dead centre of the piston and a second chamber portion bordered by a third axial face, the second and third axial faces are oppositely directed and the second face having a smaller area than the third axial face, the volume of the second chamber portion increasing and that of the first chamber section decreasing at the start of the compression stroke of the piston, wherein the first chamber portion has an open connection with a compression accumulator through first connecting channel means and the second chamber portion is connected to the compression pressure accumulator through a second connecting channel having a non-return valve and is connectable to pressure means for starting the compression stroke, whereafter the first connecting channel means are opened in order to exert pressure on the third axial face, wherein the plunger-shaped extension comprises passage means extending from the first to the second chamber portion in the bottom dead centre of the piston, and a resiliently supported and axially movable closure element extending within the second chamber portion and lying in a path of the passage means in the third axial face and closing the passage means at the end of the expansion stroke of the piston and opening the passage means at the start of the compression stroke.

3. The free-piston engine according to claim 1, further comprising means acting upon the closure element such that when the piston springs back at the end of the expansion stroke the closure element follows the piston and continues to close the passage means, but when the compression stroke starts the closure element opens the passage means.

4. The free-piston engine according to claim 3, wherein said means acting upon the closure element comprises a third chamber in which a plunger member connected to the closure means is axially movable, said plunger member comprising a fourth axial face opposite to the third axial face and bordering a room connecting to a pressure booster controlled such that when the piston springs back at the end of the expansion stroke the pressure within the room is lower than within the second chamber portion, and at the start of the compression stroke the pressure within the room is higher than within the second chamber portion.

5. The free-piston engine according to claim 4, further comprising a connecting channel between the room and the second chamber portion, in which the pressure booster is received, said pressure booster including a plunger opening said connecting channel when the piston springs back at the end of the expansion stroke, and the plunger closing off the room at the start of the expansion stroke.

6. The free-piston engine according to claim 2, further comprising means acting upon the closure element such that when the piston springs back at the end of the expansion stroke the closure element follows the piston and continues to close the passage means, but when the compression stroke starts the closure element opens the passage means.

7. The free-piston engine according to claim 6, wherein said means acting upon the closure element comprises a third chamber in which a plunger member connected to the closure means is axially movable, said plunger member comprising a fourth axial face opposite to the third axial face and bordering a room connecting to a pressure booster controlled such that when the piston springs back at the end of the expansion stroke, the pressure within the room is lower than within the second chamber portion and at the start of the compression stroke the pressure within the room is higher than within the second chamber portion.

8. The free-piston engine according to claim 7, further comprising a connecting channel between the room and the second chamber portion, in which the pressure booster is received, said pressure booster including a plunger opening said connecting channel when the piston springs back at the end of the expansion stroke and the plunger closing off the room at the start of the expansion stroke.

* * * * *

UNITED STATES PATENT AND TRADEMARK OFFICE

CERTIFICATE OF CORRECTION

PATENT NO. : 5,473,893

DATED : December 12, 1995

INVENTOR(S) : PETER A.J. ACHTEN; THEODORUS G. POTMA

It is certified that error appears in the above-indentified patent and that said Letters Patent is hereby corrected as shown below:

Col. 1, line 6, after "unit", delete "according to the preamble of claim 1.

Col. 10, line 10, after "stroke", insert --,--

Signed and Sealed this

Seventh Day of May, 1996

Attest:

BRUCE LEHMAN

*Attesting Officer* *Commissioner of Patents and Trademarks*